US012661921B2

(12) United States Patent
Mainini

(10) Patent No.: US 12,661,921 B2
(45) Date of Patent: Jun. 23, 2026

(54) GREETING CARD OPERABLE FOR CONVERSION TO THREE-DIMENSIONAL FIRE STARTER

(71) Applicant: Kevin A. Mainini, Knoxville, TN (US)

(72) Inventor: Kevin A. Mainini, Knoxville, TN (US)

( * ) Notice: Subject to any disclaimer, the term of this patent is extended or adjusted under 35 U.S.C. 154(b) by 92 days.

(21) Appl. No.: 18/929,669

(22) Filed: Oct. 29, 2024

(65) Prior Publication Data

US 2025/0326244 A1 Oct. 23, 2025

Related U.S. Application Data

(60) Provisional application No. 63/637,746, filed on Apr. 23, 2024.

(51) Int. Cl.
*B42D 15/04* (2006.01)

(52) U.S. Cl.
CPC .................................. *B42D 15/045* (2013.01)

(58) Field of Classification Search
CPC .............................. B42D 15/045; B42D 15/04
USPC ............. 40/124.01, 124.08, 124.09, 124.11, 40/124.12, 124, 14; 281/2, 3.1, 5, 15.1, 281/51; 283/61, 62, 72, 94, 98, 100, 103, 283/104, 105, 117
See application file for complete search history.

(56) References Cited

U.S. PATENT DOCUMENTS

| | | | | |
|---|---|---|---|---|
| 9,475,333 | B2 | 10/2016 | Yeh | |
| 11,661,561 | B2 | 5/2023 | Barth | |
| 11,705,021 | B2 | 7/2023 | Wise et al. | |
| 2010/0186270 | A1* | 7/2010 | Bettin, Jr. ............ | B42D 15/045 451/523 |
| 2019/0315510 | A1 | 10/2019 | Kozolup | |
| 2022/0333784 | A1 | 10/2022 | Addison | |

FOREIGN PATENT DOCUMENTS

| | | | |
|---|---|---|---|
| CA | 2901132 | A1 | 2/2016 |
| CA | 3089997 | A1 | 2/2022 |
| WO | 2017165905 | A1 | 10/2017 |

* cited by examiner

*Primary Examiner* — Justin V Lewis
(74) *Attorney, Agent, or Firm* — Luedeka Neely, P.C.

(57) ABSTRACT

A greeting card comprises a planar panel of combustible material. The planar panel has a front side on which a greeting message is provided, and a rear side on which instructions are provided for converting the planar panel into a three-dimensional fire starter structure. Scoring lines, such as perforations, are provided on the front and/or rear sides. The scoring lines define edges of elongate structural members that are operable to be mechanically separated from each other at the edges. After separation, the elongate structural members may be reassembled according to the instructions to construct a three-dimensional fire starter structure. This allows an environmentally conscientious outdoor enthusiast to enjoy a greeting card while knowing that it can be repurposed as a fire starter on a camping trip or any other place a fire needs to be started. This leads to increased enjoyment of the giving and receiving of greeting cards.

1 Claim, 7 Drawing Sheets

GREETING CARD OPERABLE FOR CONVERSION TO THREE-DIMENSIONAL FIRE STARTER

RELATED APPLICATIONS

This application claims priority to provisional patent application Ser. No. 63/637,746 filed Apr. 23, 2024, titled Greeting Card Designed to be Repurposed to Aid in Starting a Camp Fire, the entire content of which is incorporated herein by reference.

FIELD

This invention relates to the field of greeting cards. More particularly, this invention relates to a greeting card that is operable for conversion to a three-dimensional fire starter structure.

BACKGROUND

Conventional greeting cards are typically not repurposed, other than being recycled. Generally, such greeting cards are simply disposed of in the trash, leading to more landfill waste. Because conventional greeting cards are typically thrown away because they do not have a secondary function, they are rarely appreciated to the fullest extent. As a result, fewer greeting cards are given to people who are environmentally conscientious.

What is needed, therefore, is a greeting card and method of use that allows the purchaser to give a greeting card that not only has sentimental meaning, but which can also be repurposed in an environmentally friendly way. Also needed is a greeting card and method of use that allows the recipient to accept the greeting card with dual appreciation: sentimental and practical.

SUMMARY

The above and other needs are met by a product that allows an environmentally conscientious outdoor enthusiast to enjoy a greeting card while knowing that it can be repurposed as a fire starter on their next camping trip or any other place a fire needs to be started. This leads to increased enjoyment of the giving and receiving of greeting cards. Preferred embodiments described herein differ from conventional greeting cards in that they appeal to the sentimentality of both the purchaser and the recipient, as well as adding an additional and practical function as a fire starter. Thus, the preferred embodiments described herein provide an improvement on what currently exists in that they allow for greeting cards to be utilized in a purposeful manor.

Some preferred embodiments of the invention are directed to a greeting card comprising a first planar panel of combustible material. The first planar panel comprises a front side having a first area in which a greeting message is provided, and a rear side opposite the front side. The rear side has a second area in which instructions are provided for converting the first planar panel into a three-dimensional fire starter structure. Scoring lines are provided on one or more of the front and rear sides. The scoring lines define edges of a plurality of elongate structural members that are operable to be mechanically separated from each other at the edges. After separation, the elongate structural members are operable to be reassembled according to the instructions to construct the three-dimensional fire starter structure.

In some embodiments, the greeting card includes a plurality of slots in the edges of the elongate structural members. The slots are for interlocking the edges of the elongate structural members to form the three-dimensional fire starter structure.

In some embodiments, each elongate structural member includes four slots.

In some embodiments, the greeting message and the instructions are printed on the front and rear sides of the first planar panel.

In some embodiments, the scoring lines are formed by one or more of laser engraving, milling, cutting with a blade, and routing.

In some embodiments, the scoring lines are printed to indicate where to cut the first planar panel using a knife, scissors, or other cutting tools to separate the elongate structural members from each other.

In some embodiments, the first planar panel is formed from wood, paper, or wax-impregnated cardboard.

In some embodiments, each of the elongate structural members is substantially rectangular and identical to each of the other elongate structural members.

In some embodiments, the first planar panel comprises six elongate structural members.

In some embodiments, greeting card includes a second planar panel having an outer edge that is foldably attached to an outer edge of the first planar panel, whereby the first planar panel and the second planar panel are operable to be folded together.

In some embodiments, the second planar panel has a front side and a rear side, and the greeting message is printed on one or both of the front and rear sides of the second planar panel.

In some embodiments, the second planar panel has a front side and a rear side, and the instructions are printed on one or both of the front and rear sides of the second planar panel.

In some embodiments, the second planar panel is operable to be separated from the first planar panel and used as tinder within the three-dimensional fire starter structure.

In another aspect, embodiments of the invention provide a method for converting a greeting card into a three-dimensional fire starter structure. The greeting card comprises a planar panel of combustible material having a front side on which a greeting message is provided, a rear side on which instructions are provided for converting the planar panel into the three-dimensional fire starter structure, and scoring lines on the planar panel that define edges of a plurality of elongate structural members. The method comprises:

- (a) viewing the greeting message on the front side of the planar panel;
- (b) viewing the instructions on the rear side of the planar panel;
- (c) breaking or cutting the planar panel along the scoring lines to separate the elongate structural members from each other based on the instructions;
- (d) assembling the elongate structural members according to the instructions to form the three-dimensional fire starter structure; and
- (e) building a fire using the three-dimensional fire starter structure.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
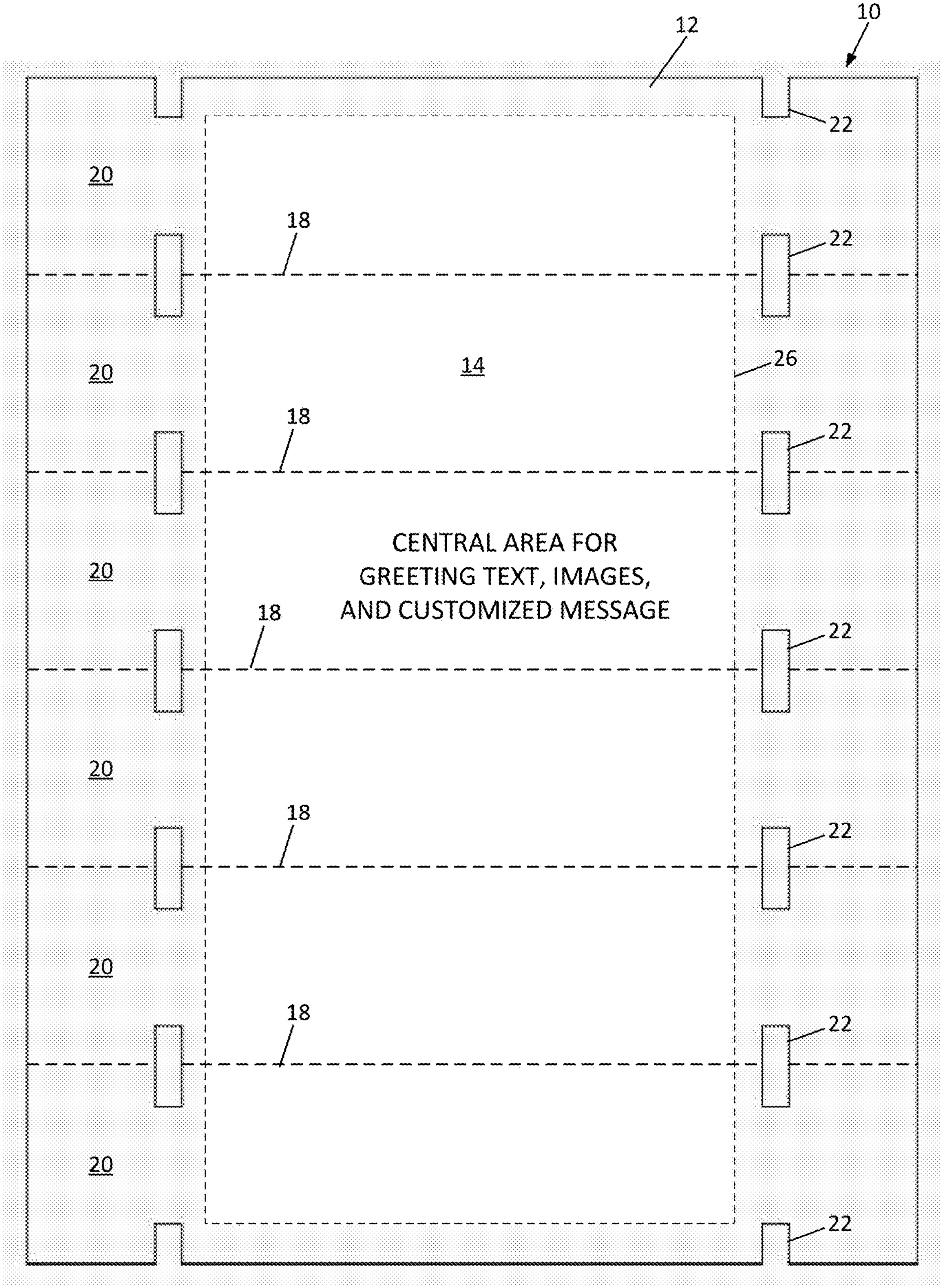
FIG. 1 depicts a front side of a greeting card according to an embodiment of the invention.
Figure 2:
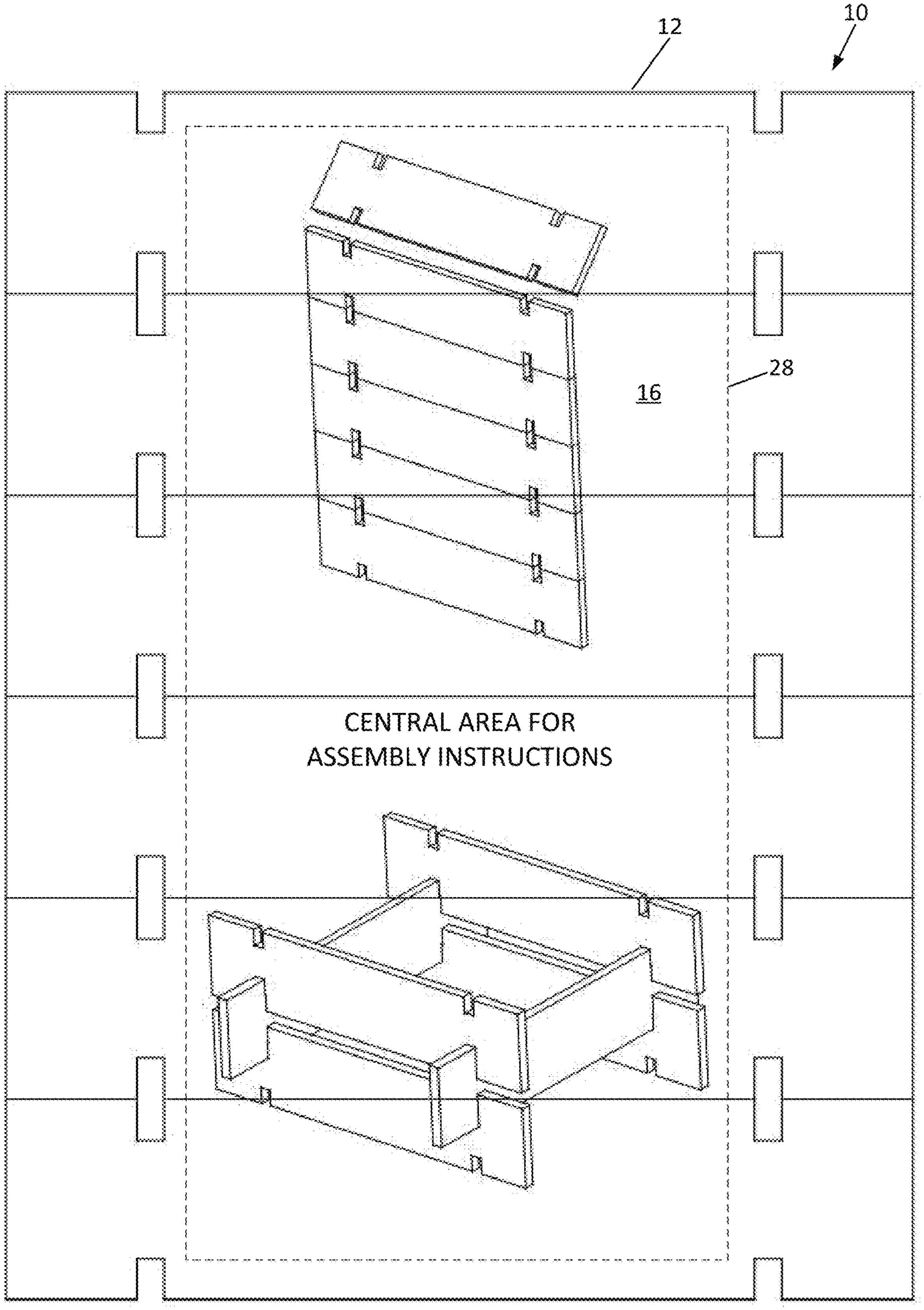
FIG. 2 depicts a rear side of the greeting card according to an embodiment of the invention.
Figure 4:
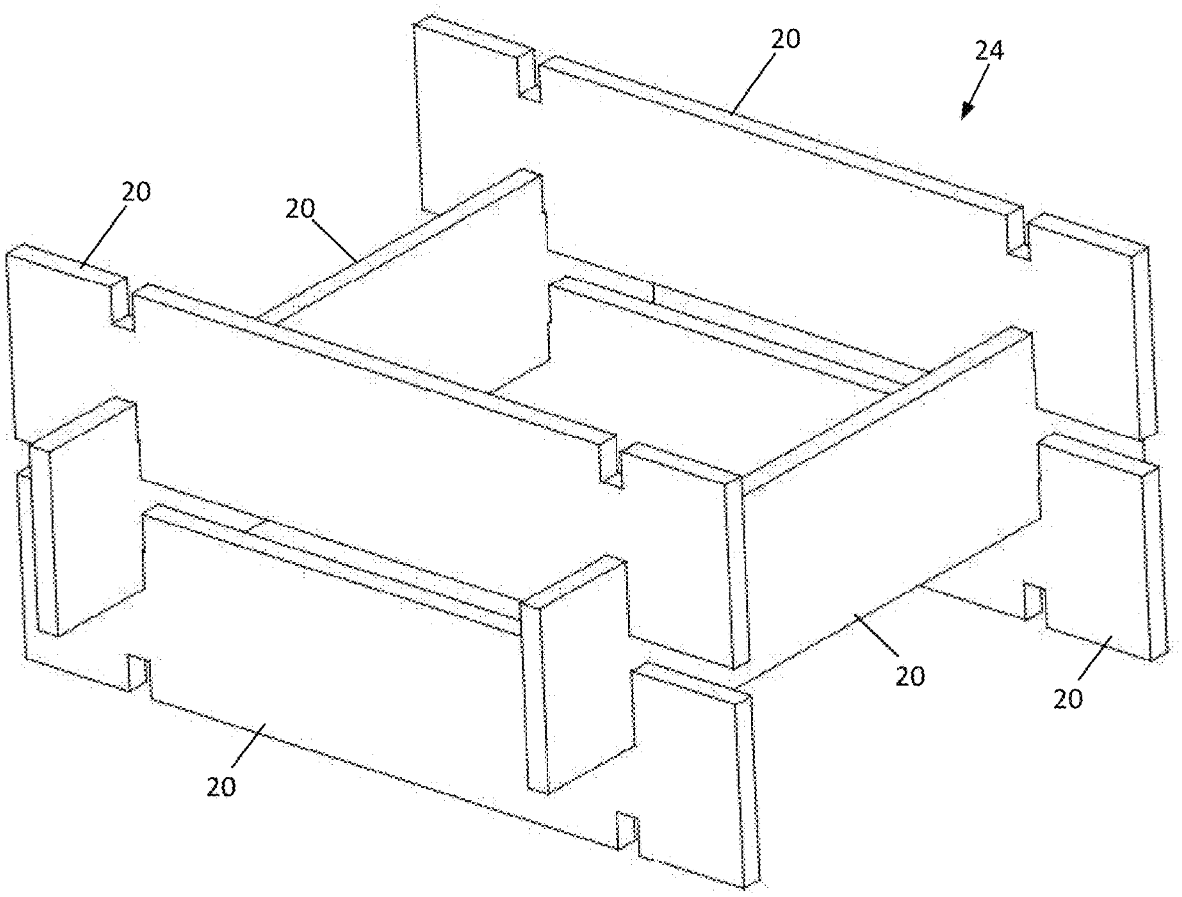
FIG. 4 depicts the greeting card reassembled as a three-dimensional fire starter structure according to an embodiment of the invention.

As shown in FIGS. 1 and 2, preferred embodiments of a greeting card 10 include a planar panel 12 having a front side 14 and a rear side 16. The panel 12 is made of combustible material, such as wood, paper, wax-impregnated cardboard, or other material that will sustain combustion for a duration that is consistent with starting a fire. The front side 14 preferably includes an area 26 for greeting text and graphics, and for the purchaser to add a customized message. In the preferred embodiment, the rear side 16 has an area 28 in which instructions are printed to show how to disassemble the panel 12 into separate structural members 20 and reassemble the structural members 20 into a three-dimensional fire starter structure 24, such as shown in FIG. 4. As the term is used herein, "instructions" refers to one or more diagrams that show the disassembly/reassembly process and/or the three-dimensional fire starter structure 24, and/or a textual description of the process.

The card 10 preferably includes scoring lines 18 on the front and/or rear sides at locations at which structural members 20 are to be broken apart or cut apart from each other. In some embodiments, the scoring lines 18 may be perforations or partial cuts formed by means such as laser engraving, milling, cutting with a blade, or routing, which make it easier for the user to mechanically manipulate the members 20 to separate them from each other. In other embodiments, the scoring lines 18 are printed indications that show the user where to cut the members 20 apart using a knife, scissors, or other cutting tools. In the embodiment depicted in the figures, there are six members 20, but it will be appreciated that there may be more or fewer members 20 in other embodiments.

The preferred embodiment includes slots 22 formed by removing material in the regions depicted in FIGS. 1 and 2. The slots 22 are used to interlock the members 20 as shown in FIG. 4 to form the three-dimensional structure 24.

An envelope is an optional addition if the greeting card is to be mailed. Also in some embodiments, the greeting message may be printed on paper or other thin material that is separate and from the panel 12, and which may be attached to the panel 12 by some means, such as a weak adhesive. This would allow the greeting message to be removed from the panel 12 and kept for sentimental reasons, or shredded and used as tinder within the structure 24 for additional aid in starting the fire.

Other elements may be packaged with the greeting card 10 to improve its functionality, such as matches, handheld lighter, flint and steel, or other fire-starting materials.

The three-dimensional structure 24 created by the deconstructed and reassembled members 20 of the card 10 could be one of a variety of three-dimensional shapes, such as teepee, log cabin, lean to, pyramid, and cross hatch.

Following are steps of a method for enjoying and using the card 10.

(1) The recipient reads the sentimental greeting and the message written by the sender on the front side 14 of the panel 12 (see FIG. 1).

(2) The recipient views the instructions on the rear side 16 of the panel 12 (see FIG. 2).

Figure 3:
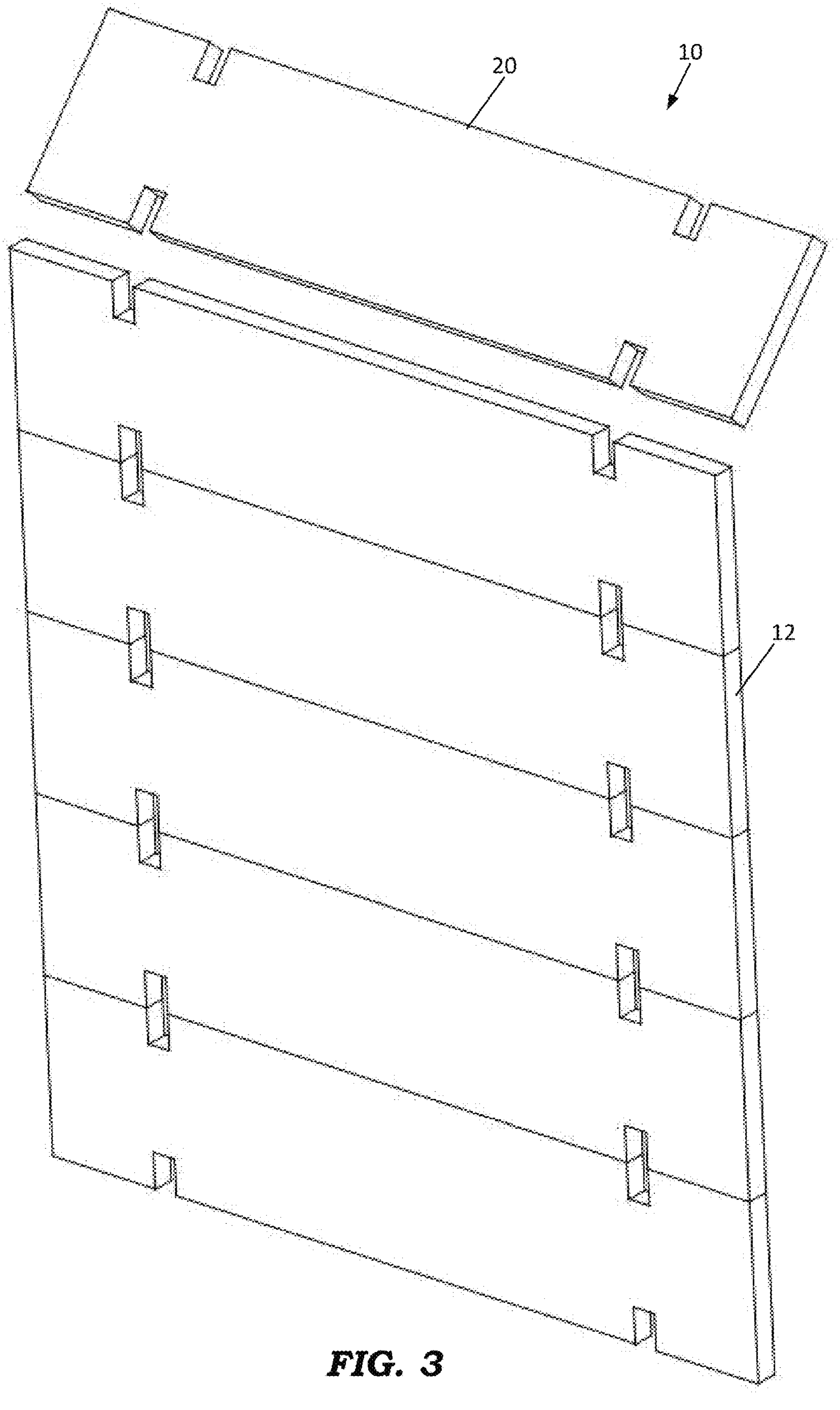
FIG. 3 depicts the greeting card in a partially disassembled state according to an embodiment of the invention.

(3) The recipient breaks the panel 12 apart along the scoring lines into the individual structural members 20 based on the instructions provided (see FIG. 3).

(4) The recipient assembles the structural members 20 to form the structure 24 that allows for ample air flow for starting a fire (see FIG. 4).

Figure 5:
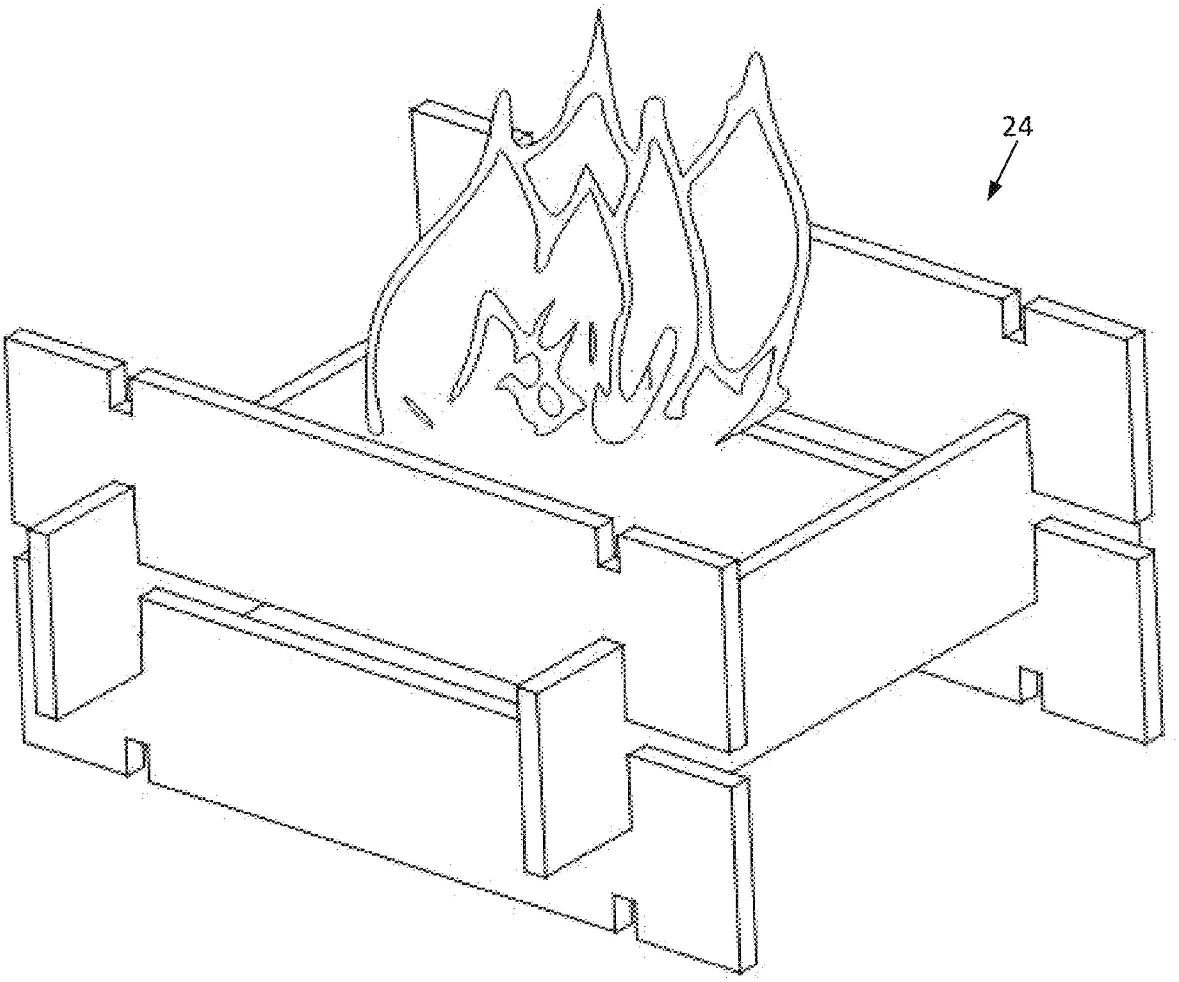
FIG. 5 depicts the three-dimensional fire starter structure with a fire burning therein according to an embodiment of the invention.

(5) The recipient continues with safe and normal fire building procedures (see FIG. 5).

Figure 6:
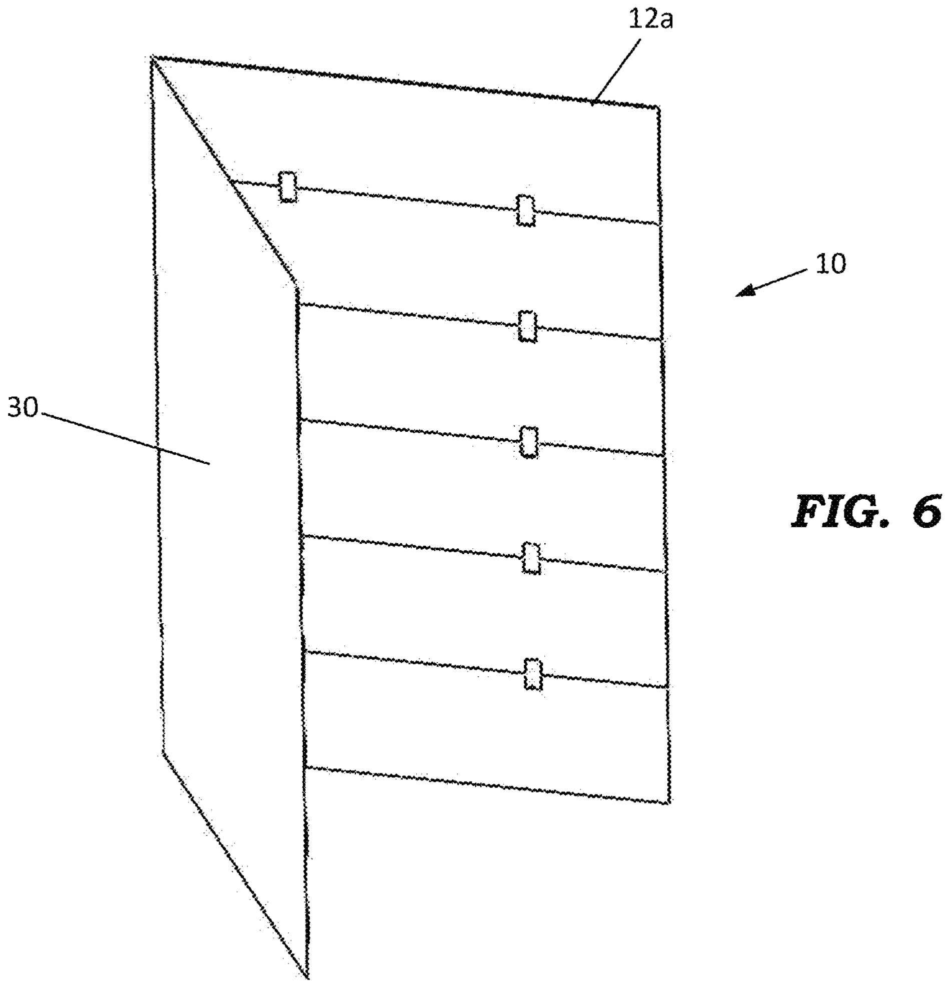
FIG. 6 depicts a partially folded greeting card according to an alternative embodiment of the invention.
Figure 7:
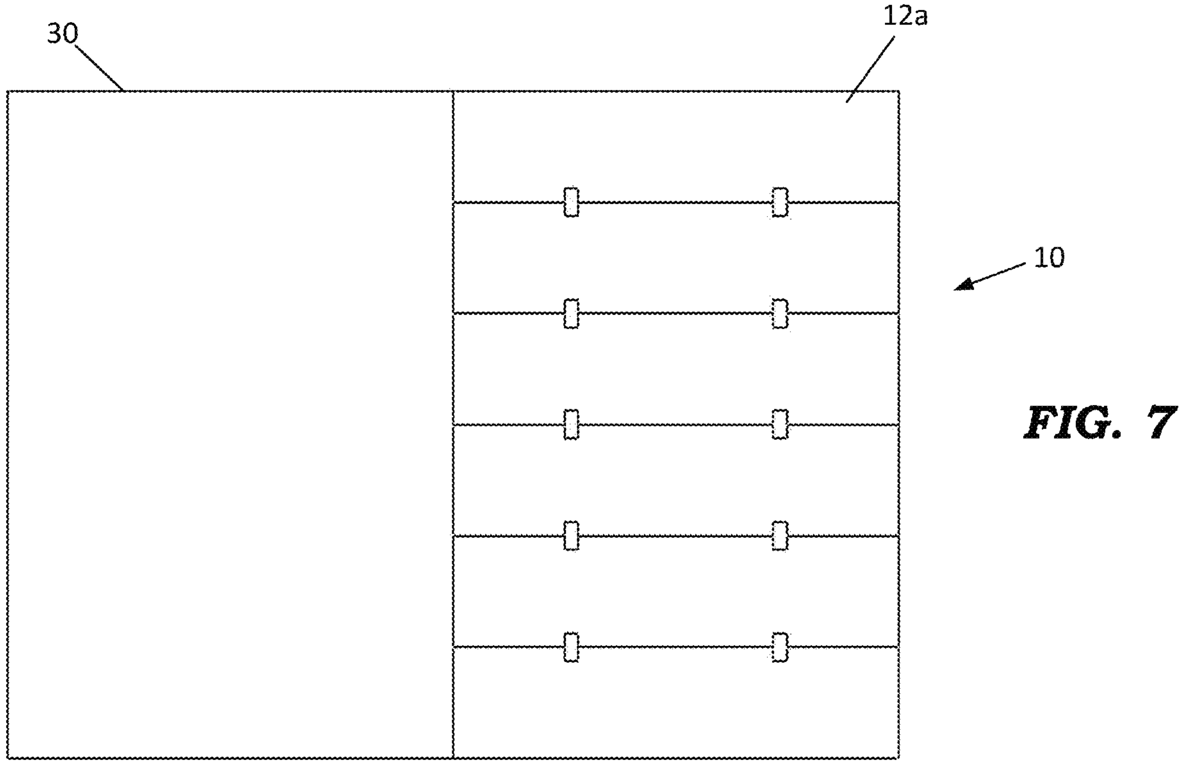
FIG. 7 depicts an unfolded greeting card according to an alternative embodiment of the invention.
Figure 8:
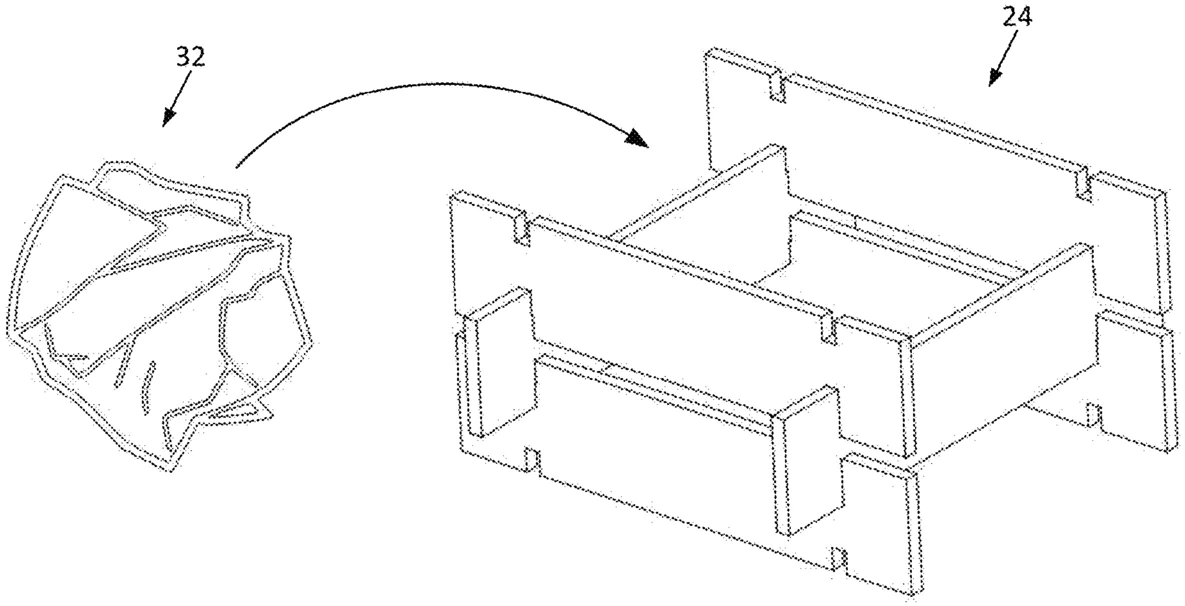
FIG. 8 depicts the greeting card reassembled as a three-dimensional fire starter structure and tinder according to an alternative embodiment of the invention.

FIGS. 6-8 depict an alternative embodiment of a greeting card 10 that comprises two adjoined planar panels 12*a* and 30 that are foldable with respect to each other. The configuration of panel 12*a* is substantially the same as the panel 12 described previously. The panel 30 has front and rear sides that either or both may include graphic and/or textual portions of a greeting message. The instructions for disassembly and reassembly of the card 10 may also be provided on either of the sides of the panel 30.

The two panels 12*a* and 30 may be formed from one continuous piece of folded combustible material. Alternatively, the two panels 12*a* and 30 may be formed separately from the same or different combustible materials that are joined together using an adhesive or a mechanical hinge formed from twine or paper or other combustible materials. Once the panels 12*a* and 30 are separated from each other, the panel 12*a* is disassembled into the structural members 20 and reassembled to form the structure 24 as described previously, and the panel 30 is wadded or torn into strips to form tinder for building a fire within the structure 24, as shown in FIG. 8.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for converting a greeting card into a three-dimensional fire starter structure, wherein the greeting card comprises a planar panel of combustible material having a front side on which a greeting message is provided, a rear side on which instructions are provided for converting the planar panel into the three-dimensional fire starter structure, and scoring lines on the planar panel that define edges of a plurality of elongate structural members, the method comprising:

(a) viewing the greeting message on the front side of the planar panel;

(b) viewing the instructions on the rear side of the planar panel;

(c) breaking or cutting the planar panel along the scoring lines to separate the elongate structural members from each other according to the instructions;

(d) assembling the elongate structural members according to the instructions to form the three-dimensional fire starter structure; and (e) building a fire using the three-dimensional fire starter structure.

* * * * *